219-121

8/12/80 XR 4,217,570

United States Patent [19]

Holmes

[11] 4,217,570

[45] Aug. 12, 1980

[54] THIN-FILM MICROCIRCUITS ADAPTED FOR LASER TRIMMING

[75] Inventor: Robert E. Holmes, Portland, Oreg.

[73] Assignee: Tektronix, Inc., Beaverton, Oreg.

[21] Appl. No.: 910,178

[22] Filed: May 30, 1978

[51] Int. Cl.[2] ........................ H01C 7/00; B23K 26/00

[52] U.S. Cl. ........................ 338/308; 29/620; 219/121 LM; 338/195

[58] Field of Search ............... 338/306, 307, 308, 309, 338/195; 346/76 L; 219/121 LM, 121 L; 427/103; 29/610 R, 620

[56] References Cited

U.S. PATENT DOCUMENTS

| | | | |
|---|---|---|---|
| 3,345,210 | 10/1967 | Wilson | 338/308 X |
| 3,607,386 | 9/1971 | Galla et al. | 338/308 X |
| 3,996,551 | 12/1976 | Croson | 338/309 |
| 4,038,517 | 7/1977 | Nelson | 338/309 X |
| 4,139,833 | 2/1979 | Kirsch | 338/308 |

OTHER PUBLICATIONS

Shibata et al., "New Type Thermal Printing Head Using Thin Film", IEEE Transactions on Parts, Hybrids and Packaging, vol. PHP-12, No. 3, pp. 223-230, Sep., 1976.

*Primary Examiner*—B. A. Reynolds
*Assistant Examiner*—E. F. Borchelt
*Attorney, Agent, or Firm*—John D. Winkelman

[57] ABSTRACT

Microcircuit structures including thin-film electrical components are provided with a multilayer passivation coating that permits laser trimming of the components through the coating without damaging it. Such a passivation coating suitably includes an underlayer of silicon oxide or other oxygen-containing material and an outer layer of silicon nitride.

5 Claims, 3 Drawing Figures

THIN-FILM MICROCIRCUITS ADAPTED FOR LASER TRIMMING

BACKGROUND OF THE INVENTION

The present invention relates generally to electrical microcircuit structures with silicon nitride passivation, and more particularly to improved structures that allow included thin-film components to be laser trimmed without damaging the passivation coating.

In the manufacture of thin-film and monolithic hybrid microcircuits, passive circuit elements such as resistors and capacitors are prepared from films of materials only a few thousand angstroms thick. The films usually are deposited by vacuum evaporation or sputtering, with the necessary patterning being accomplished before, during, or after deposition. As a final step before packaging, a protective overcoating or passivation film may be applied to the circuit. A good passivation coating is especially necessary if the microcircuit will not be sealed in a hermetic enclosure. Silicon nitride ($Si_3N_4$) is used extensively as a passivation material because of its high resistivity and dielectric strength, excellent chemical resistance, and superior electrical and thermal stability.

Even with well-controlled processes, the values of initially fabricated thin-film components typically fall within a 5-15% tolerence range. More accurate values are achieved by physically removing portions of the components in a subsequent trimming operation. Airborne abrasive, electric arc, and laser beam trimming systems have been developed for this purpose. Laser trimming systems have a number of significant advantages, including greater speed, accuracy, and cleanliness. In addition, they can be used under computer control to adjust circuit components while their values are being measured.

Components may be laser trimmed after the passivation film is applied if a laser operating in the visible or near infrared region is used. By so doing, a completed circuit can be adjusted for optimum operation during active, functional testing.

In the past it has not been possible to trim certain thin-film components in silicon nitride-passivated circuits without damaging the nitride layer. For example, during trimming of Nichrome and other nickel- or chromium-containing films, voids and cracks in the passivation layer are produced, forming an entry point for contaminants.

Because of the superior protection provided by silicon nitride, there is a need to provide a way to laser trim thin-film components containing nickel, chromium, or other metals in hybrid circuits that incude a $Si_3N_4$ passivation layer.

SUMMARY OF THE INVENTION

According to the present invention, the above-expressed need has been satisfied by the discovery that a contiguous oxygen-containing film formed over thin-film components containing nickel, chromium, or other metal allows laser trimming of the components through an overlying silicon nitride passivation layer without damaging it. Suitable film materials include the stable oxides of aluminum, silicon, tantalum, titanium, and zirconium.

DETAILED DESCRIPTION OF THE INVENTION

Figure 1:
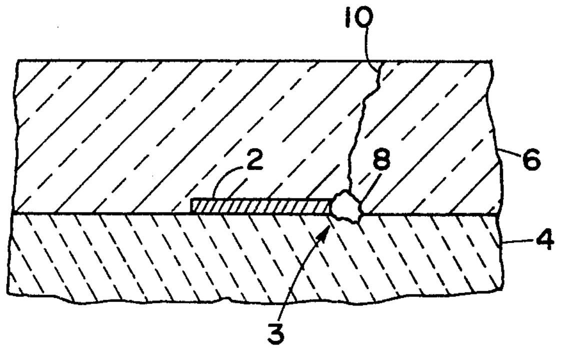
FIG. 1 (PRIOR ART)
FIG. 1 is a fragmentary sectional view of a prior art microcircuit including a thin-film resistor that has been laser trimmed through an overlying silicon nitride passivation layer.

Turning now to the drawings, the problem solved by the present invention is illustrated in FIG. 1. A thin-film resistance element 2 on a substrate 4 has been laser trimmed along one edge 3 through an overlying silicon nitride passivation layer 6. The trimming operation has produced a void 8 at the trimmed edge of the resistance element, and a crack 10 that extends from the void to the outer surface of the nitride passivation layer. Fractures in the passivation provide an entry point for moisture and contamination, which adversely affect circuit reliability and performance. Such fractures are particularly detrimental if the passivation layer is the sole form of environmental protection for the circuit, i.e., where it is not packaged in a separate hermetic enclosure.

It is believed that such voids and cracking result from the formation of unstable metal nitrides, nickel and chromium nitrides for example, during laser trimming. Such nitrides are created by reactions between a component's constituents and the $Si_3N_4$ passivation layer as the laser beam vaporizes portions of the thin-film components. The nitrides dissociate at the high localized temperatures produced by the trimming operation, forming nitrogen gas that expands and fractures the passivation layer.

Figure 2:
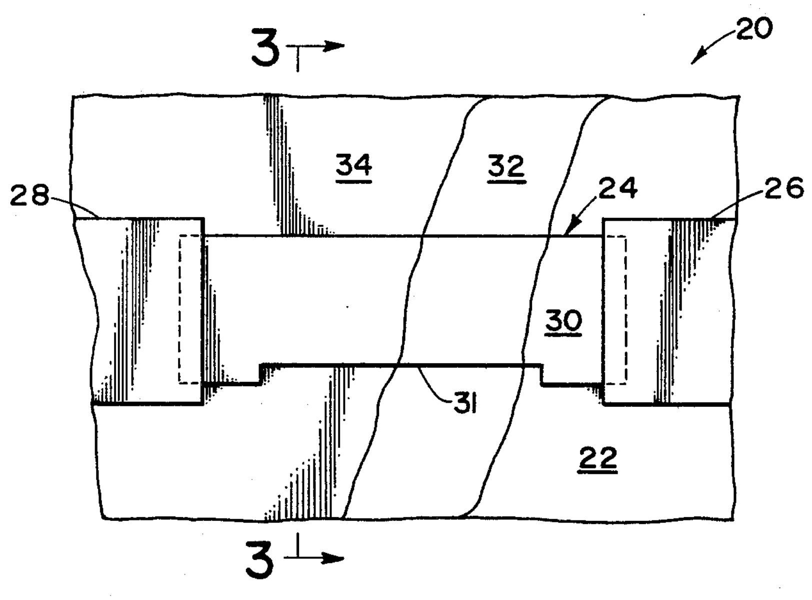
FIG. 2 is a fragmentary plan view of a laser-trimmed thin-film microcircuit structure according to the present invention.
Figure 3:
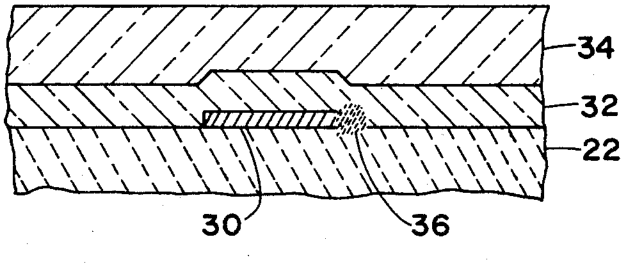
FIG. 3 is a sectional view taken along view line 3—3 in FIG. 2.

An improved microcircuit structure free from the just-described problem is shown in FIGS. 2 and 3. Referring first to FIG. 2, a hybrid circuit 20 supported on an insulative substrate 22 of glass, alumina, silicon oxide, or the like includes a thin-film resistor 24. The resistor comprises a pair of electrical terminals 26, 28 overlapping the opposite ends of an elongate resistive film element 30. Element 30 is deposited on substrate 22 by vacuum evaporation or sputtering of a suitable resistance material, such as chromium, a nickel-chromium alloy (Nichrome), an alloy of chromium and silicon (e.g., $CrSi_2$), or a cermet composed of chromium and silicon oxide. Terminals 26, 28 are of a similarly-deposited conductive metal, usually gold or aluminum.

Overlying resistor 24 is a passivation coating formed by an oxide underlayer 32 and an outer layer 34 of silicon nitride. The oxide underlayer functions to prevent the formation of metal nitrides during laser trimming, and may be any oxide film with the required electrical properties that can be made to adhere satisfactorily to the circuit substrate and components. Suitable materials include aluminum oxide ($Al_2O_3$), tantalum oxide ($Ta_2O_5$), titanium dioxide ($TiO_2$), silicon oxides ($SiO$, $SiO_2$) and zirconium oxide ($ZrO$). Silicon oxides are particularly preferred.

Referring to FIG. 3 along with FIG. 2, metal constituents of resistive element 30 react with passivation underlayer 32 during laser trimming to form stable metal oxides rather than unstable nitrides. These oxides diffuse out into adjacent portions of the substrate and oxide underlayer to form a zone 36 of comparatively high resistivity adjoining trimmed edge 31 of thin-film element 30.

The passivation coating layers are applied by any suitable process, such as chemical vapor deposition. The underlayer must be thick enough to prevent fracturing of the passivation coating during laser trimming, and its thickness will depend on the thickness of the material being trimmed. By way of example, resistors formed by the deposition of a 50 ohms per square, 400 angstrom thick Nichrome thin-film have been trimmed satisfactory through a passivation coating consisting of a 2,000 angstrom glassy silicon oxide underlayer and an outer layer of $Si_3N_4$ having a thickness of about 8000 angstroms. As will be understood, the silicon nitride is applied in a thickness sufficient to provide the desired environmental protection, and typically is in the range of about 7,000 to 12,000 angstroms. The oxide layer preferably has a minimum average thickness of about 1000 angstroms.

While the best mode presently contemplated for practicing the invention has been set forth, it will be appreciated that various changes and modifications are possible in addition to those specifically mentioned. The appended claims are thus intended to cover all such variations and modifications as come within the scope of the invention.

I claim:

1. A microcircuit structure comprising a substrate, a thin-film electrical component disposed on said substrate, said component being formed from a material containing a metal capable of reacting with silicon nitride at the temperature produced by laser trimming of the component to form a metal nitride having a dissociation temperature no higher than the first-mentioned temperature, and an unfractured protective coating covering said component and adjoining surface areas of the substrate, said coating including a layer of an oxide deposited to a minimum average thickness of about 1000 angstroms on said component and substrate surface areas, and an overlying layer of silicon nitride, said structure including a relatively high resistance region within said oxide layer adjoining said component, said region being formed by laser trimming of the component through said protective coating and containing a stable reaction product of said metal with said oxide layer.

2. The structure of claim 1, wherein said metal-containing materials is selected from the group consisting of chromium, nickel-chromium alloys, chromium-silicon alloys and cermets composed of chromium and silicon oxide.

3. The structure of claim 1, wherein said oxide is one selected from the group consisting of aluminum oxides, silicon oxides, tantalum oxides, titanium oxides, and zirconium oxides.

4. The structure of claim 1, wherein said reaction product comprises a metal oxide selected from the group consisting of chromium oxides, nickel oxides and mixtures thereof.

5. A microcircuit structure comprising a substrate, a thin-film electrical circuit component disposed on said substrate, said component being formed from a metal-containing material selected from the group consisting of chromium, nickel-chromium alloys, chromium-silicon alloys and cermets composed of chromium and silicon oxide, and an unfractured protective coating covering said component and adjoining surface areas of the substrate, said coating including a layer of oxide at least about 1000 angstroms thick deposited on said component and substrate surface areas, and an overlying layer of silicon nitride, said oxide being selected from the group consisting of aluminum oxides, silicon oxides, tantalum oxides, titanium oxides, and zirconium oxides, said structure including a high resistance region adjoining said component, said region being formed by laser-trimming of the component through said protective coating and including a metal oxide selected from the group consisting of chromium oxides, nickel oxides and mixtures thereof.

* * * * *